US00RE44594E

(19) United States
(12) Reissued Patent
Macchetti et al.

(10) Patent Number: US RE44,594 E
(45) Date of Reissued Patent: Nov. 12, 2013

(54) METHOD AND CIRCUIT FOR DATA ENCRYPTION/DECRYPTION

(75) Inventors: Marco Macchetti, Lodi (IT); Stefano Marchesin, Udine (IT); Umberto Bondi, Porza (CH); Luca Breveglieri, Seregno (IT); Guido Bertoni, Cusan Milianino (IT); Pasqualina Fragneto, Burago di Molgora (IT)

(73) Assignee: STMicroelectronics S.R.L., Agrate Brianza (MB) (IT)

(21) Appl. No.: 13/456,457

(22) Filed: May 29, 2012

Related U.S. Patent Documents

Reissue of:
(64) Patent No.: 7,801,301
Issued: Sep. 21, 2010
Appl. No.: 09/974,705
Filed: Oct. 10, 2001

(51) Int. Cl.
*H04L 9/00* (2006.01)

(52) U.S. Cl.
USPC ..... 380/29; 380/28; 380/37; 380/46; 380/239; 713/189; 713/193

(58) Field of Classification Search
USPC ..... 380/28, 29, 37, 46, 239; 713/189, 193
See application file for complete search history.

(56) References Cited

U.S. PATENT DOCUMENTS

| | | | |
|---|---|---|---|
| 5,533,127 | A | 7/1996 | Luther |
| 2001/0024502 | A1 | 9/2001 | Ohkuma et al. |
| 2002/0157009 | A1 | 10/2002 | Yamamoto et al. |
| 2002/0191784 | A1 | 12/2002 | Yup et al. |

OTHER PUBLICATIONS

McLoone et al. "Rijndael FPGA Implementation Utilizing Look-Up Tables" 0-7803-7145-3/01; 2001 IEEE.
Karri et al. "Concurrent Error Detection of Fault-Based Side-Channel Cryptanalysis of 128-Bit Symmetric Block Ciphers" DAC 2001, Jun. 18-22, 2001: Law Vegas, NV; 2001 ACM; 1-58113-297-2/01/0006.
Zakiya Advanced Encryption Standard (AES) 2nd Part: http//groups-beta.google.com/group/comp.lang.forth/messages/13942DF3ECF97F79?HL, May 2001.
Zakiya Advanced Encryption Standard (AES) 2nd Part: http//groups-beta.google.com/group/comp.lang.forth/messages/A8640A6548D8FC1B, May 2001.
Mc Loone, Maire; McCanny, John V; "Rijndael FPGA Implementation Utilizing Look-Up Tables", Sep. 26-28, 2001; Signal Processing Systems, 2001 IEEE Workshop; pp. 349-360.*
Ramesh Karri, Kaijie Wu, Piyush Mishra, Yongkook Kim; "Concurrent error detection of fault-based side-channel cryptanalyis of 128-bit symmetric block ciphers"; Jun. 2001; Proceedings of the 38th conference on Design automation; pp. 579-584.*
http://groups-beta.google.com/group/comp.lang.forth—May 28, 2001, 1:59 pm by Jabari Zakiya "Advanced Encryption Standard (AES) 2nd Part"; pp. 1-12; Google Group.*
Riaz A. Usmani, "Applied Lineaar Algebra" (1987) pp. 34-36.*

* cited by examiner

*Primary Examiner* — Michael Simitoski
(74) *Attorney, Agent, or Firm* — Allen, Dyer, Doppelt, Milbrath & Gilchrist, P.A.

(57) ABSTRACT

Data are converted between an unencrypted and an encrypted format according to the Rijndael algorithm, including a plurality of rounds. Each round is comprised of a fixed set of transformations applied to a two-dimensional array, designating states, of rows and columns of bit words. At least a part of the transformations are applied on a transposed version of the state, wherein rows and columns are transposed for the columns and rows, respectively.

45 Claims, 4 Drawing Sheets

Figure 2:
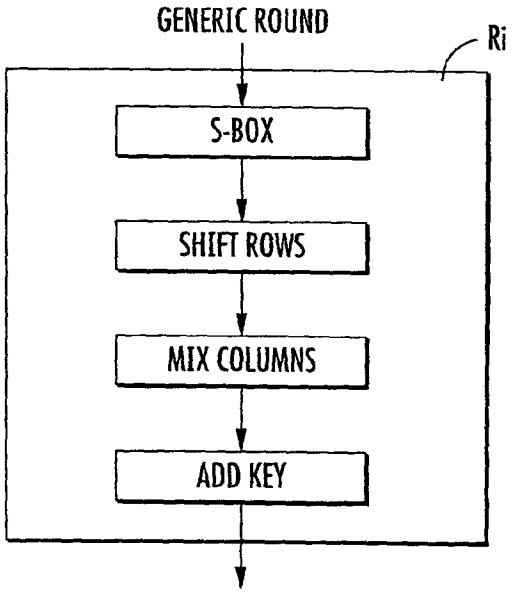
FIG. 2 (PRIOR ART)

$$M \quad \begin{bmatrix} S_0 & S_4 & S_8 & S_{12} \\ S_1 & S_5 & S_9 & S_{13} \\ S_2 & S_6 & S_{10} & S_{14} \\ S_3 & S_7 & S_{11} & S_{15} \end{bmatrix} \Rightarrow \quad MI \quad \begin{bmatrix} S_0 & S_1 & S_2 & S_3 \\ S_4 & S_5 & S_6 & S_7 \\ S_8 & S_9 & S_{10} & S_{11} \\ S_{12} & S_{13} & S_{14} & S_{15} \end{bmatrix}$$

METHOD AND CIRCUIT FOR DATA ENCRYPTION/DECRYPTION

Matter enclosed in heavy brackets [ ] appears in the original patent but forms no part of this reissue specification; matter printed in italics indicates the additions made by reissue.

FIELD OF THE INVENTION

The invention relates to encryption/decryption techniques and more specifically refers to Advanced Encryption Standard (AES) cryptosystems based e.g. on the so-called Rijndael algorithm.

BACKGROUND OF THE INVENTION

The Rijndael algorithm is a block cipher algorithm operating on blocks of data. The algorithm reads an entire block of data, processes the block and then outputs the encrypted data. The Rijndael algorithm needs a key, which is another block of data. The proposed AES standard will include only a 128-bit standard length for plaintext blocks and 128, 192 and 256-bit standard lengths for the key material.

For a general review of the Rijndael/AES algorithms reference may be made to the following documents[/websites:]

[J. Daemen, V. Rijmen, "AES Proposal: Rijndael" www.nist.gov/aes;]

J. Daemen, V. Rijmen, "The Block Cipher Rijndael" Smart Card Research and Applications, LNCS 1820, J.-J. Quisquater and B. Schneier, Eds., Springer-Verlag, 2000, pp. 288-296;

J. Daemen and V. Rijmen, "Rijndael, the advanced encryption standard", Dr. Dobb's Journal, Vol.-26, No. ~3, March 2001, pp. 137-139;

[V. Rijmen, "Efficient Implementation of the Rijndael S-box" "www.eas.kuleuven.ac.be/~rijmen/rijndael/";]

[J. Gladman "A specification for Rijndael, the AES Algorithm" March 2001 "www.fp.gladman.plus.com/";]

M. Akkar, C. Giraud "An implementation of DES and AES, secure against some attacks"—Proceedings of CHES 2001, pp. 315-325;

M. McLoone, J. V. McCanny "High performance single-chip FPGA Rijndael algorithm implementations"—Proceedings of CHES 2001, pp. 68-80;

V. Fischer, M. Drutarovsky "Two methods of Rijndael implementation in reconfigurable Hardware" Proceedings of CHES 2001, pp. 81-96;

H. Kuo and I. Verbauwhede "Architectural optimization for a 3 Gbits/sec VLSI Implementation of the AES Rijndael algorithm", Proceedings of CHES 2001, pp. 53-67;

Rudra, P. K. Dubey, C. S. Jutla, V. Kumar, J. R. Rao, and P. Rohatgi "Efficient Rijndael encryption implementation with composite field arithmetic" Proceedings of CHES 2001, pp.175-188;

A. Dandalis, V. K. Prasanna, J. P. D. Rolim "An adaptive cryptographic engine for IPSec architecutures" Field-Programmable Custom Computing Machines, 2000 IEEE Symposium on 2000, [pp. 132-141;] *132-141.*

["Advanced Encryption Standard (AES)" "www.nist.gov/aes",]

[National Institute of Standards and Technology "www.nist.gov/aes";]

[Rijndael Home Page's "www.esat.kuleuven.ac.be/rijmen/rijndael/";]

[Gladman Home Page "www.fp.gladman.plus.com/";]

Figure 1:
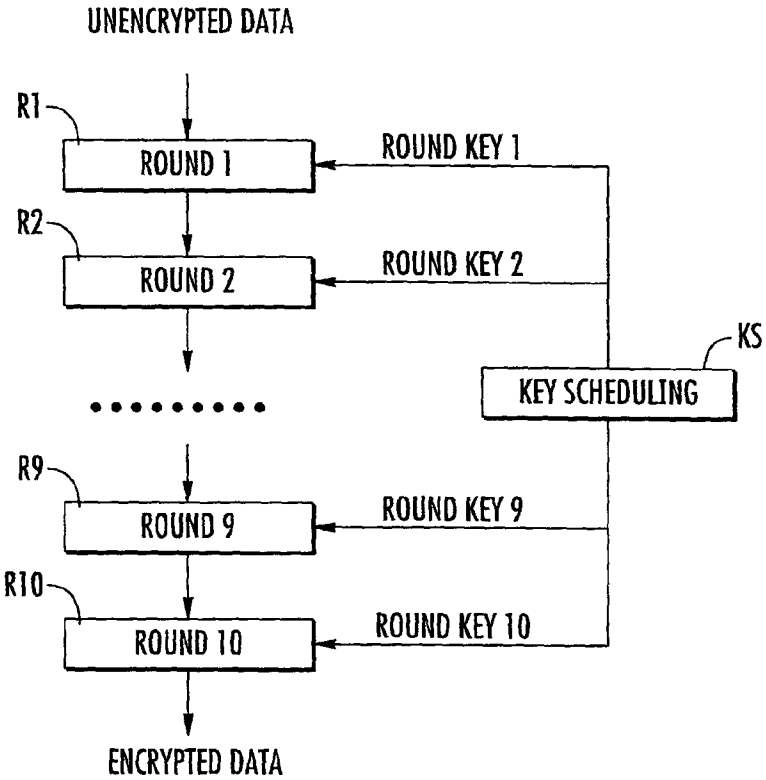
FIG. 1 (PRIOR ART)

The encryption process based on the Rijndael algorithm follows the general layout shown in FIG. 1 of the enclosed drawings.

Unencrypted data are subject to a sequence of "rounds" R1, R2, . . . , R9, R10. Each round in turn provides for the application of a respective round key (i.e. round key 1, round key 2, . . . ) generated according to a key scheduling process KS.

Each generic round Ri develops along the lines shown in FIG. 2 and is essentially based on a first processing step currently referred to as the S-box step or function. This generates a matrix array which is subjected to a row shifting process followed by column mixing.

The respective key scheduled for round Ri is then added to produce the output of the round. The output of the final round (designated round 10 in FIG. 1) corresponds to the encrypted data.

More specifically, the first and last rounds are at least marginally different from the other rounds: the first round is in fact comprised of key addition only, while the last round does not provide for mix column transformation.

The decryption algorithm of AES is very similar to the encryption process just described. The decryption process is essentially based on a sequence of steps reproducing in a complementary manner the sequence of steps of the encryption process, wherein each transformation is replaced by the respective inverse transformation.

All of the foregoing corresponds to basic principles and criteria well known to those of skill in the art (see, for instance, the references cited in the introductory portion of this description), thus making it unnecessary to provide a more detailed description herein. This applies more to the point to the steps/functions designated "S-box" and "Add Key" in FIG. 2.

Figure 3:
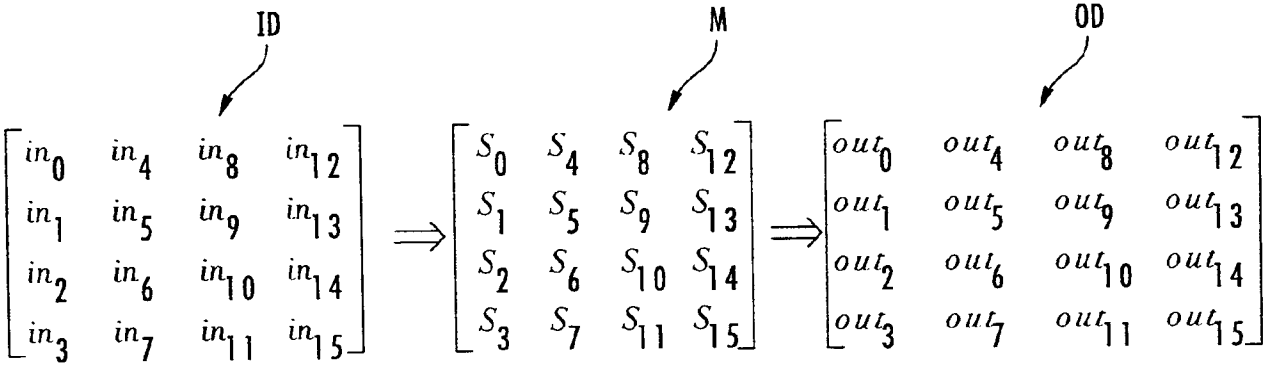
FIG. 3 (PRIOR ART)

FIG. 3 is a schematic representation of a round in matrix form.

Apart from the add round key, sub byte and shift row operations, the application of a single round can essentially be described as the application to an array of input data ID of a matrix M to generate a corresponding array of output data OD. Data ID and OD are in typical 32-bit format partitioned in four 8-bit words (bytes).

In current implementations of the Rijndael/AES algorithm, matrix M is thus a matrix including 4×4=16 elements $s_0, \ldots, s_{15}$ is corresponding to a byte.

Figure 4:
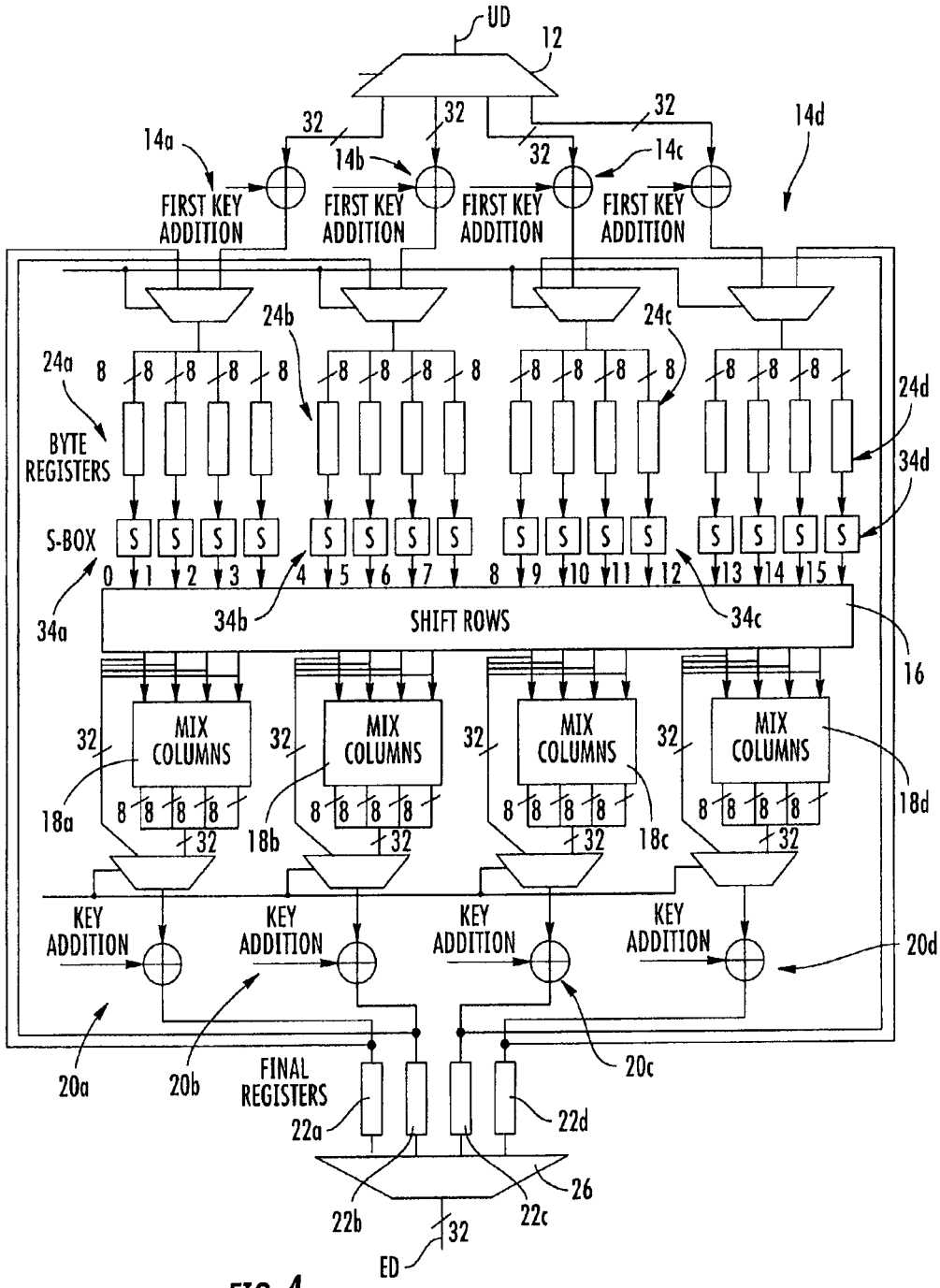
FIG. 4 (PRIOR ART)

The block diagram of FIG. 4 shows a typical embodiment of an encryption system implementing the Rijndael/AES algorithm according to the traditional approach followed so far.

The system shown in FIG. 4, designated 10 overall, is intended to generate encrypted data starting from unencrypted data UD. Both unencrypted and encrypted data UD and ED are arranged in a 32-bit word format.

In the diagram of FIG. 4, reference numeral 12 designates a demultiplexer which distributes the input unencrypted data stream UD over four different paths leading to respective adder modules 14a, 14b, 14c and 14d where the first key addition is performed.

Reference numerals 24a, 24b, 24c and 24d designates respective sets of byte registers wherein the 32-bit words subjected to the first key addition are distributed over four byte registers to be subsequently fed to respective sets of modules 34a, 34b, 34c and 34d where the S-box processing takes place.

Reference 16 designates a module which implements the shift row operation. Data blocks resulting from row shifting are fed to respective mix column modules 18a, 18b, 18c and 18d.

These latter modules are intended to be bypassed during the last round. In fact the structure shown permits the first round to be calculated immediately. Iterative calculation is then carried out for the following rounds. As indicated, the last round does not provide for the mix column step, whereby lines are shown enabling such a step to be bypassed during the last round.

The data output from modules 18a, 18b, 18c and 18d—which are arranged over four parallel 8-bit words—are then fed to respective key addition modules 20a, 20b, 20c and 20d where the key addition operation is performed. After being subjected to key addition in modules 20a, 20b, 20c and 20d data are loaded into final registers 22a to 22d from which the encrypted code words are fed to a multiplexer unit 26 to generate the encrypted data stream ED.

All of the foregoing again corresponds to principles and criteria which are known to those of skilled in the art.

The main disadvantage of the prior art solutions exemplified by the arrangement shown in FIG. 4 lies in the complex circuitry required to implement the encryption/decryption mechanism. Such a disadvantage is particularly felt to those envisaged applications of cryptosystems adapted for use in embedded systems such as, e.g., smartcards and the like.

SUMMARY OF THE INVENTION

One main object of the present invention is thus to provide an improved form of implementing the Rijndael/AES algorithm making it possible to expand the field of use of such algorithm in cryptosystems.

According to the present invention, this object, as well as additional objects are achieved by means of a method and system using a transposed arrangement for the internal state array of a matrix to provide a more rapid encryption/decryption process. The present invention also provides a circuit for implementing the process.

The arrangement of the invention can in fact be regarded as embodying a novel encryption method, which however can be rendered compatible with existing standards through initial and final transposition steps.

DETAILED DESCRIPTION OF THE DRAWINGS

Figure 5:
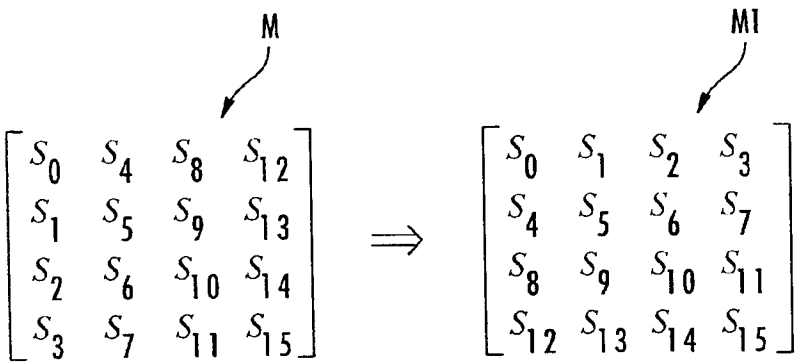
Figure 6:
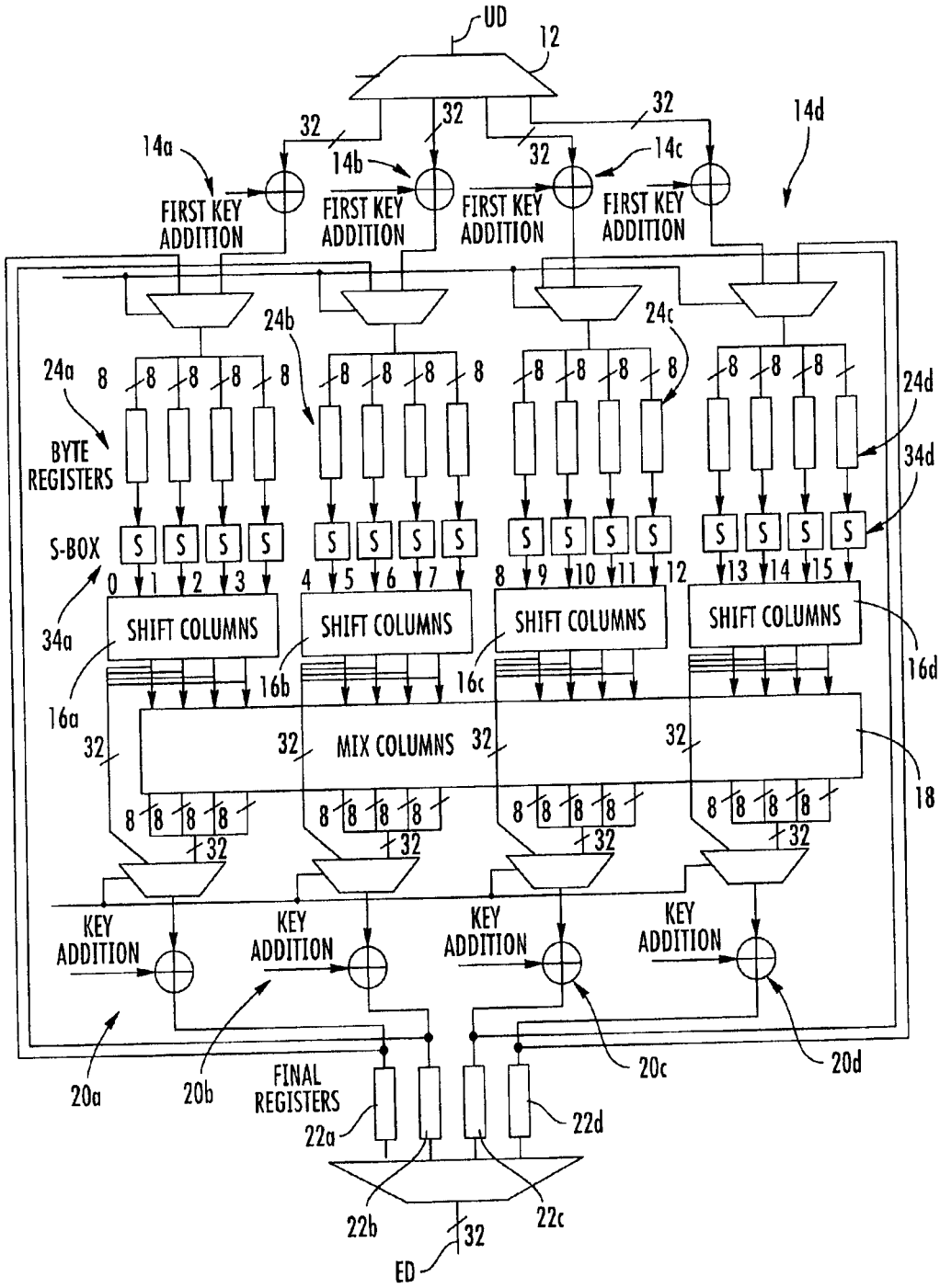

The invention will now be described, by a way of non limiting example, by referring to the enclosed drawings, wherein:

FIGS. 1 to 4, illustrate prior art approaches for implementing the Rijndael/AES algorithm, FIG. 5 illustrates comparison to FIG. 3, the basic underlying mechanism of the present invention, and FIG. 6 is a schematic diagram of a data encryption/decryption circuit according to the present invention.

DETAILED DESCRIPTION OF THE PREFERRED EMBODIMENTS OF THE PRESENT INVENTION

In order to better understand the basic underlying principle of the invention, it must be recalled that Rijndael is a secret key cryptographic algorithm working in block cipher mode. This means that it operates on blocks of data and not on single bits or bytes. The algorithm reads an entire block, processes it and then outputs the encrypted block. The decryption operates in a complementary way to re-obtain plaintext starting from encrypted data.

To operate properly, the Rijndael algorithm needs a key, which is another block of data.

The initial specification for this algorithm includes 128-bit, 192-bit and 256-bit as possible lengths for the plaintext blocks and for the key material. The prospected AES standard will expectedly include only 128-bit as standard length for plaintext blocks and 128, 192 and 256-bit as standard length for the key material.

The following description will therefore deal—by way of example only—with 128-bit blocks, as this adheres to the presently prognosticated standard.

The input, output and cipher key bit sequences are processed as arrays of bytes formed by dividing these sequences into groups of 8 contiguous bits (bytes). Internally, the operations of the AES algorithm are performed on a two dimensional array of bytes called the state.

Specifically, by referring again to FIG. 3, matrix ID represents the input bytes, matrix M represents the state bytes, and OD designates the output bytes. The state consists of four rows of bytes, each row containing 4 bytes, thus making the state a 4×4 matrix.

The four bytes in each column of the state array M form 32-bit words, hence the state can also be interpreted as a one-dimensional array of 32-bit words (columns), where the column number provides an index into this array.

As shown in connection with FIG. 2, the Rijndael cipher algorithm operates in rounds. Each round is a fixed set of transformations that are applied to the state.

The number of these rounds is chosen as a function of the key length. In the case of the three examples referred to in the foregoing, three possible key sizes of 128-bit, 196 and 256 bits can be considered. Depending on these sizes, 10 rounds (as shown in FIG. 1), 12 rounds or 14 rounds are to be computed, respectively.

The present invention is based on the unexpected recognition that using for the internal state array a transposed arrangement (that is, using—in the place of matrix M—matrix M' where the rows have been exchanged for the columns and vice-versa) leads to a surprising speed-up and simplification of the encryption/decryption process.

According to the prior art, an operation is applied to the columns, for instance column $S_0$ $S_1$ $S_2$ $S_3$ of matrix M1.

When the state is transposed, the column becomes $S_0$ $S_4$ $S_8$ $S_{12}$.

This concept may be better understood by referring to the example which follows of a transformation carried out on a non-transposed state.

$$\begin{bmatrix} S_{0,c} \\ S_{1,c} \\ S_{2,c} \\ S_{3,c} \end{bmatrix} = \begin{bmatrix} 02 & 03 & 01 & 01 \\ 01 & 02 & 03 & 01 \\ 01 & 01 & 02 & 03 \\ 03 & 01 & 01 & 02 \end{bmatrix} \begin{bmatrix} S_{0,c} \\ S_{1,c} \\ S_{2,c} \\ S_{3,c} \end{bmatrix}$$

where c is the column index which can be equal to 0, 1, 2, and 3.

If a new, transposed form is used, the main transformation for the new mix column becomes $$y_0=(\{02\}\cdot x_0)+(\{03\}\cdot x_1)+x_2+x_3$$

$$y_1=x_0+(\{02\}\cdot x_1)+(\{03\}\cdot x_2)+x_3$$

$$y_2=x_0+x_1+(\{02\}\cdot x_2)+(\{03\}\cdot x_3)$$

$$y_3=(\{03\}\cdot x_0)+x_1+x_2+(\{02\}\cdot x_3)$$

Transposed Form $x_i=S_{0,i}\ S_{1,i}\ S_{2,i}\ S_{3,i}$ where $x_i$, $0\leq i\leq 3$ are the words of the transposed state, and $y_i$, $0\leq i\leq 3$ are the words of the transposed state after mix column transformation.

In the foregoing, operator means a multiplication in a Galois field applied to each of the four 8-bit terms comprising the 32-bit words being processed (i.e. $\{02\}\cdot x_0$ means $\{02\}\cdot S_{0,0}\ \{02\}\cdot S_{1,0}\ \{02\}\cdot S_{2,0}\ \{02\}\cdot S_{3,0}$) while the operator+ is a sum in Galois Fields, a logic XOR between two 32-bit words.

Such a transposition requires a redefinition of most of the operations performed in a round of the algorithm, and also if the key schedule. Therefore, also the round keys must be transposed before being applied to a round providing for the use of a transposed state.

A trivial solution for that purpose is simply to apply the original key schedule unchanged and then add code to transpose every created round key. In that way, a large overhead would be introduced.

For that reason, the preferred embodiment of the invention provides for the key schedule being applied directly in the transposed manner.

This means that the internal behavior of the system is modified, and simplified, the only requirement to obtain compatibility with the standard being that the state must be retransposed before being outputs.

The block diagram of FIG. 6 shows how the prior art arrangement shown in FIG. 4 is simplified and rendered faster by resorting to the invention.

In FIG. 6 parts and components which are identical or equivalent to those already described in connection with FIG. 4 have been indicated with the same reference numerals.

Essentially, the solution of the invention has a basic impact on the shift row block 16 and the mix column blocks 18a, 18b, 18c and 18d of FIG. 4.

In the solution of the invention, four shift column modules 16a, 16b, 16c and 16d—each acting on a respective flow from one of the S-box modules 34a, 34b, 34c and 34d—are substituted for shift row module 16.

By referring to the two tables reproduced in the foregoing, it will become apparent that in the solution of the invention generation of each of the components $y_0\ y_1\ y_2\ y_3$ essentially derives from a linear combination of words $x_0\ x_1\ x_2\ x_3$. This makes it possible to implement the respective transformation simply by means of adder modules (and shift registers).

In the block diagram of FIG. 6 a single mix column module 18 is provided jointly operating on all of the sixteen 8-bit words output from shift column modules 16a, 16b, 16c, 16d is substituted for mix column modules 18a, 18b, 18c and 18d of the prior art arrangement of FIG. 4.

Experimentation carried out by the applicants demonstrates that the invention significantly increases the speed of implementing the Rijndael algorithm, even if the overhead due to the initial and final transpositions of the state array is taken into account.

Direct comparison of the solution of the invention with the so-called Gladman's implementation (reportedly the fastest soft implementation of the Rijndael algorithm currently available) shows that the invention leads to improvements in terms of encryption and decryption speeds of 46% and 33%, respectively, for a 128-bit key size.

Improvements demonstrated in encryption and decryption speeds with a 192-bit key size are 39% and 25%, respectively.

Finally, improvements in encryption and decryption speed of 45% and 32%, respectively were demonstrated for a 256-bit key size.

It will be appreciated that advantages in terms of latency are primarily felt at the level of software implementation, while the main advantage at the hardware level lies (even with identical performance in terms of latency) in the smaller amount of functional units required. This leads to simpler and less expensive systems, which is a particularly relevant factor in the case of decryption systems.

The solution of transposing the state matrix can be applied to all cases contemplated by the Rijndael algorithm, advantages being significant especially for 128 and 256 bit words. As indicated, if no initial and final transpositions to ensure compatibility with the existing standards are effected, a thoroughly novel cryptographic systems is obtained.

The present invention has been described with reference to the preferred embodiments. However, the present invention is not limited to those embodiments. Various changes and modifications may be made within the spirit and scope of the amended claims.

The invention claimed is:

1. A method of converting data between an unencrypted format and an encrypted format, the data being organized in bit words and being stored in at least one register, the method comprising:

using a circuit cooperating with the at least one register to convert the data by at least performing a plurality of transformation rounds, each transformation round having a respective round key and comprising applying at least one transformation to a two-dimensional array of rows and columns of bit words defining a state array, exchanging each of the rows with a respective column of the state array to form a transposed state array for at least one of the transformation rounds so that the at least one transformation is applied to the transposed state array, transposing the respective round key, and applying the respective transposed round key to the state array in at least one of the transformation rounds; and using the circuit to transpose an output of a final round from the plurality of transformation rounds.

2. A method according to claim 1 wherein the bit words are 8-bit words.

3. A method according to claim 1 wherein the state array is a 4×4 matrix of bit words.

4. A method according to claim 1 wherein the plurality of transformation rounds comprises at least 10 transformation rounds.

5. A method according to claim 1 wherein performing further comprises performing at least one transformation round on a non-transposed state array.

6. A method according to claim 1 further comprising adding code to transpose the respective round key for each of the plurality of transformation rounds.

7. A method according to claim 1 wherein each respective round key is applied according to a round key schedule.

8. A method according to claim 7 wherein the round key schedule comprises a transposed round key schedule.

9. A device for converting data between an unencrypted format and an encrypted format, the device comprising:

at least one register configured to store the data in the form of bit words; and a circuit configured to convert the data by at least performing a plurality of transformation rounds, each transformation round having a respective round key and comprising applying at least one transformation to a two-dimensional array of rows and columns of bit words defining a state array, exchanging each of the rows with a respective column of the state array to form a transposed state array for at least one of the transformation rounds so that at least one transformation is applied to the transposed state array, transposing the respective round key, and applying the respective transposed round key to the state array in at least one of the transformation rounds, and transposing an output of a final round from the plurality of transformation rounds.

10. A device according to claim 9 wherein said at least one register is configured to store bit words as 8-bit words.

11. A device according to claim 9 wherein said circuit is a decoder for converting data from an encrypted data format to an unencrypted data format.

12. A device according to claim 9 wherein said circuit is configured to operate on a state array comprising a 4×4 matrix of bit words.

13. A device according to claim 9 wherein said circuit is configured to perform a plurality of transformation rounds performs at least 10 transformation rounds.

14. A device according to claim 9 wherein said circuit comprises at least one S-box processing module, said at least one S-box processing module being configured to operate on a group of bit words defining a cell of a column of the state array.

15. A device according to claim 14 wherein the at least one S-box processing module comprises a plurality of S-box modules, each of the plurality of S-box modules being configured to operate on a corresponding cell of a column of the state array.

16. A device according to claim 15 wherein the colunm of the state array comprises four cells.

17. A device according to claim 9 wherein the circuit further comprises a plurality of shift column modules, each of said plurality of shift column modules being configured to perform a column shift operation on a column of the state array.

18. A device according to claim 17 wherein a column shift operation performed by each of said plurality of shift column modules generates shift column data, and wherein said circuit further comprises a single mix column module to perform column mix operations on shift column data.

19. A device according to claim 9 wherein said circuit is an encoder for converting data from an unencrypted data format to an encrypted data format.

20. A device according to claim 19 wherein said circuit is an embedded system for use in a smart card.

21. A device according to claim 11 wherein said circuit is an embedded system for use in a smart card.

22. A method of converting data between an unencrypted format and an encrypted format, the data being organized in 8-bit words and being stored in at least one register, the method comprising:

using a circuit cooperating with the at least one register to convert the data by at least performing a plurality of transformation rounds for converting the data, each transformation round having a respective round key and comprising applying at least one transformation to a two-dimensional array of rows and columns of 8-bit words defining a state array comprising a 4×4 matrix of 8-bit words, exchanging each of the rows with a respective column of the state array to form a transposed state array for at least one of the transformation rounds so that the at least one transformation is applied to the transposed state array, transposing the respective round key, and applying the respective transposed round key to the state array in at least one of the transformation rounds; and using the circuit to transpose an output of a final round from the plurality of transformation rounds.

23. A method according to claim 22 further comprising adding code to transpose the respective round key for each of the plurality of transformation rounds.

24. A method according to claim 22 wherein each respective round key is applied according to a round key schedule.

*25. A method of converting data between an unencrypted format and an encrypted format, the data being organized in bit words and being stored in at least one storage element, the method comprising:*

*using a circuit cooperating with the at least one storage element to convert the data by at least performing a plurality of transformation rounds, each transformation round having a respective round key and comprising*

*applying at least one transformation to a two-dimensional array of rows and columns of bit words defining a state array,*

*exchanging each of the rows with a respective column of the state array to form a transposed state array for at least one of the transformation rounds so that the at least one transformation is applied to the transposed state array,*

*transposing the respective round key, and*

*applying the respective transposed round key to the state array in at least one of the transformation rounds; and*

*using the circuit to transpose an output of a final round from the plurality of transformation rounds.*

*26. A method according to claim 25 wherein the bit words are 8-bit words.*

*27. A method according to claim 25 wherein the state array is a 4×4 matrix of bit words.*

*28. A method according to claim 25 wherein the plurality of transformation rounds comprises at least 10 transformation rounds.*

*29. A method according to claim 25 wherein performing further comprises performing at least one transformation round on a non-transposed state array.*

*30. A method according to claim 25 further comprising adding code to transpose the respective round key for each of the plurality of transformation rounds.*

*31. A method according to claim 25 wherein each respective round key is applied according to a round key schedule.*

*32. A method according to claim 31 wherein the round key schedule comprises a transposed round key schedule.*

*33. A device for converting data between an unencrypted format and an encrypted format, the device comprising:*

*at least one storage element configured to store the data in the form of bit words; and*

*a circuit configured to convert the data by at least*

*performing a plurality of transformation rounds, each transformation round having a respective round key and comprising*

*applying at least one transformation to a two-dimensional array of rows and columns of bit words defining a state array,*

*exchanging each of the rows with a respective column of the state array to form a transposed state array*

*for at least one of the transformation rounds so that at least one transformation is applied to the transposed state array,*

*transposing the respective round key, and*

*applying the respective transposed round key to the state array in at least one of the transformation rounds, and*

*transposing an output of a final round from the plurality of transformation rounds.*

*34. A device according to claim 33 wherein said at least one storage element is configured to store bit words as 8-bit words.*

*35. A device according to claim 33 wherein said circuit is configured to operate on a state array comprising a 4×4 matrix of bit words.*

*36. A device according to claim 33 wherein said circuit is configured to perform a plurality of transformation rounds performs at least 10 transformation rounds.*

*37. A device according to claim 33 wherein said circuit comprises at least one S-box processing module, said at least one S-box processing module being configured to operate on a group of bit words defining a cell of a column of the state array.*

*38. A device according to claim 37 wherein the at least one S-box processing module comprises a plurality of S-box modules, each of the plurality of S-box modules being configured to operate on a corresponding cell of a column of the state array.*

*39. A device according to claim 38 wherein the column of the state array comprises four cells.*

*40. A device according to claim 33 wherein the circuit further comprises a plurality of shift column modules, each of said plurality of shift column modules being configured to perform a column shift operation on a column of the state array.*

*41. A device according to claim 40 wherein a column shift operation performed by each of said plurality of shift column modules generates shift column data, and wherein said circuit further comprises a single mix column module to perform column mix operations on shift column data.*

*42. A device according to claim 33 wherein said circuit is an encoder for converting data from an unencrypted data format to an encrypted data format.*

*43. A device according to claim 42 wherein said circuit is an embedded system for use in a smart card.*

*44. A device according to claim 33 wherein said circuit is a decoder for converting data from an encrypted data format to an unencrypted data format.*

*45. A device according to claim 44 wherein said circuit is an embedded system for use in a smart card.*

* * * * *